United States Patent [19]

Höckele et al.

[11] Patent Number: 4,457,063
[45] Date of Patent: Jul. 3, 1984

[54] METHOD OF MAKING A HIGH TENSILE CONNECTION FOR OVERHEAD POWER LINES

[75] Inventors: Max Höckele, Berglen-Steinach; Wolfgang G. Törpe, Neuhausen; Karl Behan, Stuttgart, all of Fed. Rep. of Germany

[73] Assignee: Karl Pfisterer Elektrotechnische Spezialartikel GmbH & Co. KG, Stuttgart, Fed. Rep. of Germany

[21] Appl. No.: 409,148

[22] Filed: Aug. 18, 1982

Related U.S. Application Data

[63] Continuation of Ser. No. 195,176, Oct. 8, 1980, abandoned, which is a continuation of Ser. No. 915,265, Jun. 13, 1978, abandoned.

[51] Int. Cl.³ .................. B21D 39/00; B23P 11/00
[52] U.S. Cl. .................. 29/520; 403/282; 191/40
[58] Field of Search .................. 29/520, 516, 517; 403/274, 282, 284; 191/40

[56] References Cited

U.S. PATENT DOCUMENTS

| | | | |
|---|---|---|---|
| 2,198,149 | 4/1940 | Bangert | 29/516 |
| 3,152,392 | 10/1964 | Coppack et al. | 29/517 |
| 3,192,622 | 6/1965 | Bannerman | 29/517 |
| 3,293,931 | 3/1966 | Guarnaschelli | 29/520 |

Primary Examiner—Charlie T. Moon
Attorney, Agent, or Firm—Davis, Hoxie, Faithfull & Hapgood

[57] ABSTRACT

A device for providing a high tensile, electrically insulated connection between two sections of the lead wire of an overhead power line is disclosed. The device is suitable for use as a line separator or phase separator of a lead wire which supplies power to the current collector of a railway vehicle. The device comprises spaced parallel, glass-fiber reinforced plastic insulating rods, each of the ends of which are connected with metal rods of the same outside diameter, and which are arranged in a common plane with the lead wire sections. Two tubular traverses extend transversely to the insulating rods and are rigidly connected to the metal rods at the ends of the insulating rods. A cable system is provided for suspending the device from a support cable. Also disclosed is a method of connecting the plastic rods with the metal rods to form high tensile connections, the metal rods having an axial clamping channel and the method including progressive radial compression of the metal rods about the plastic rods.

3 Claims, 12 Drawing Figures

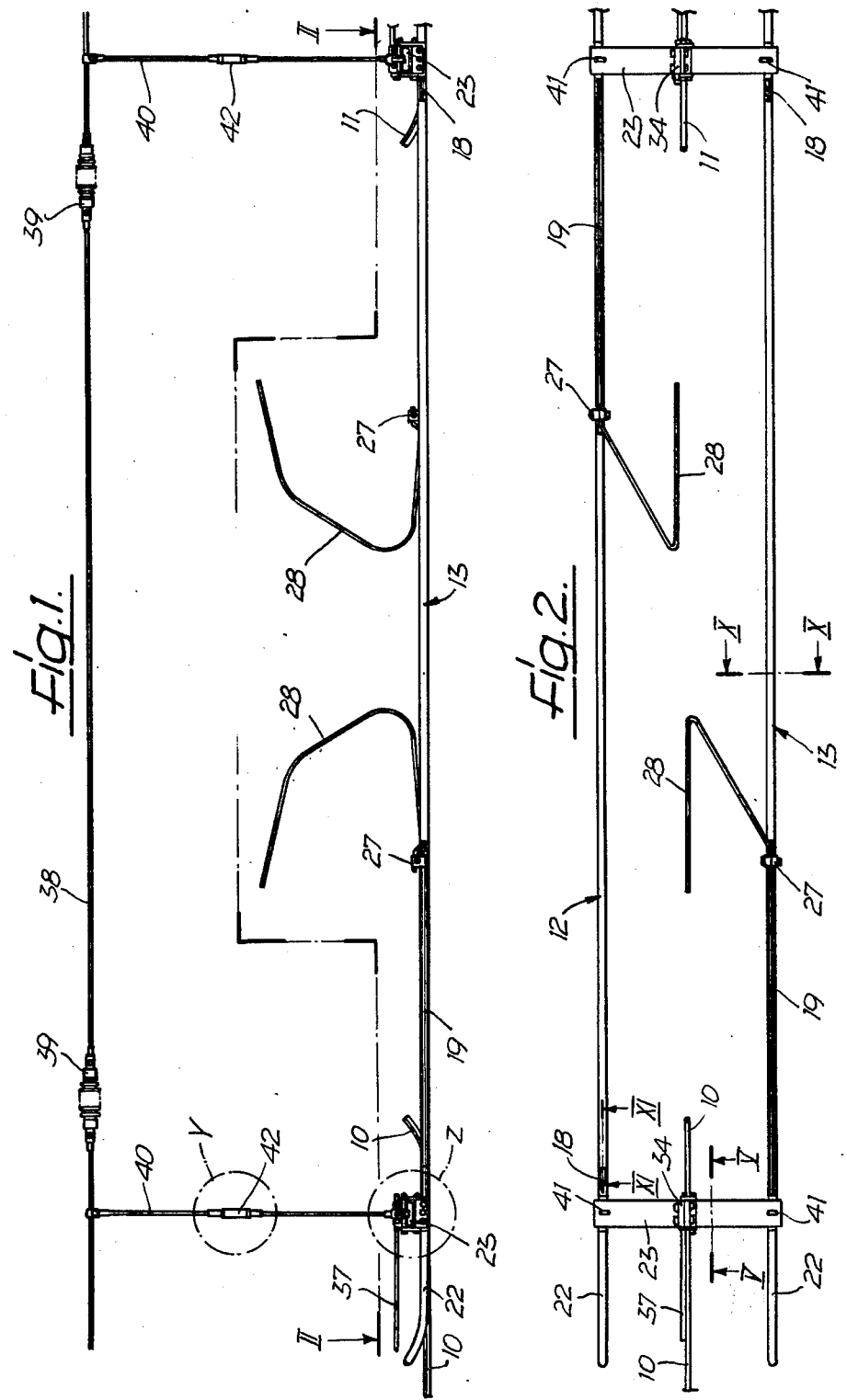

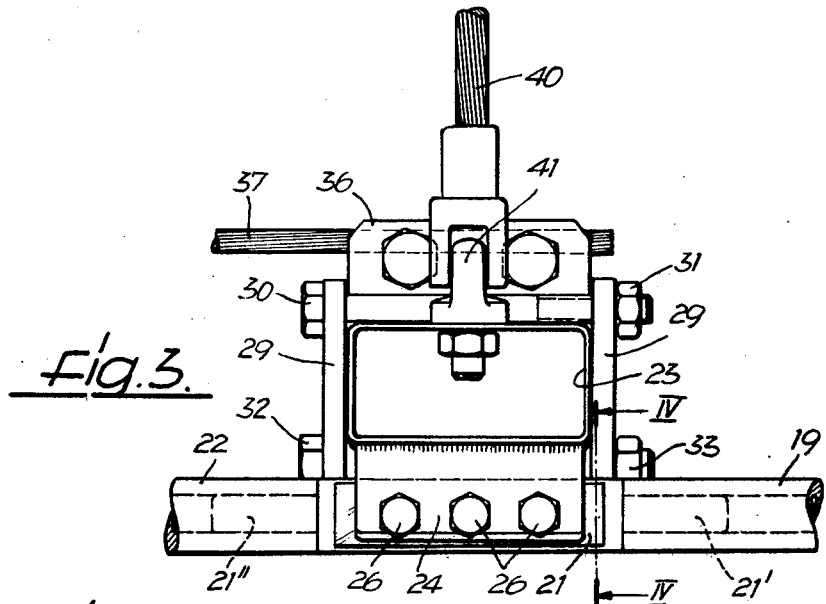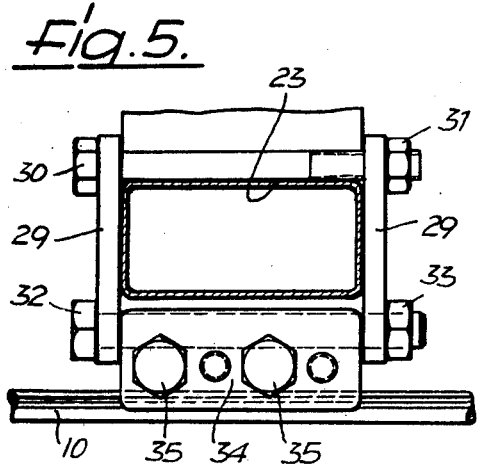

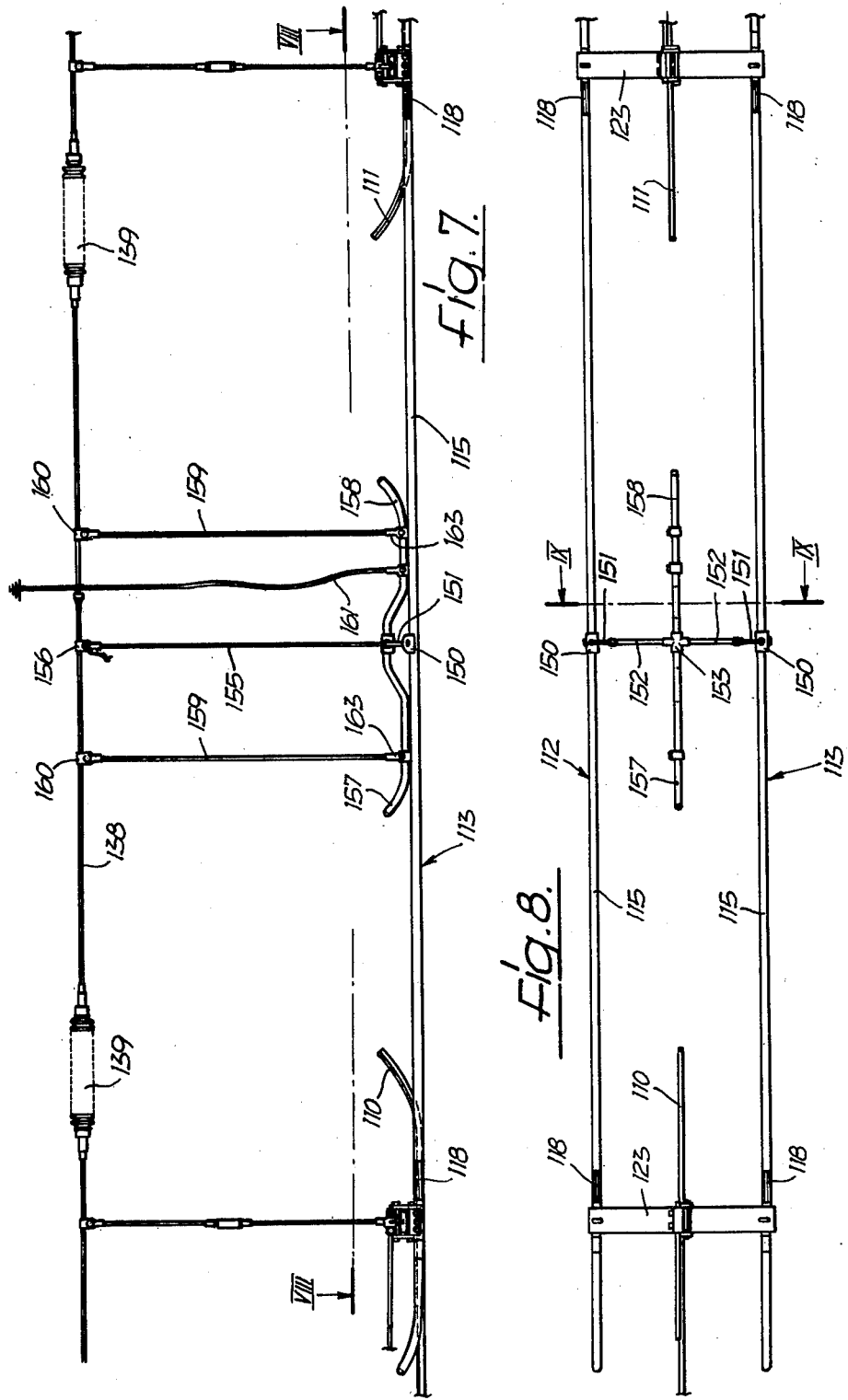

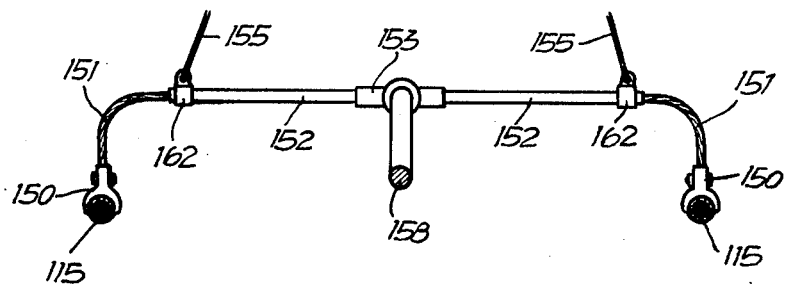
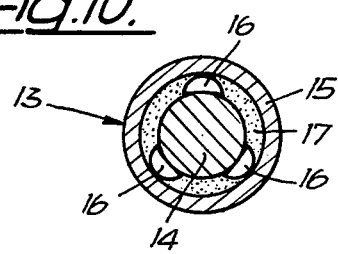
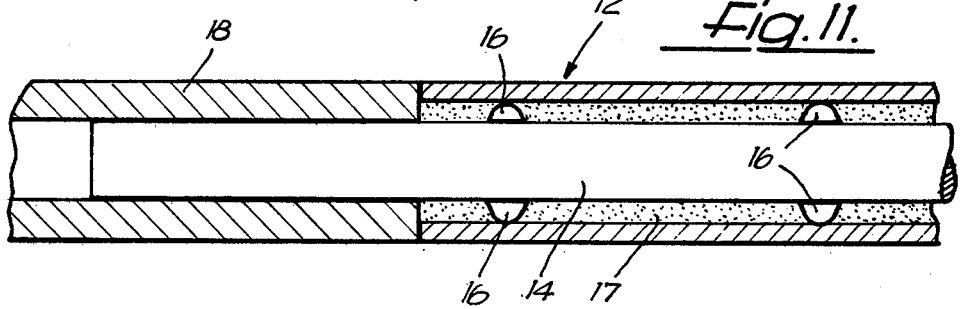
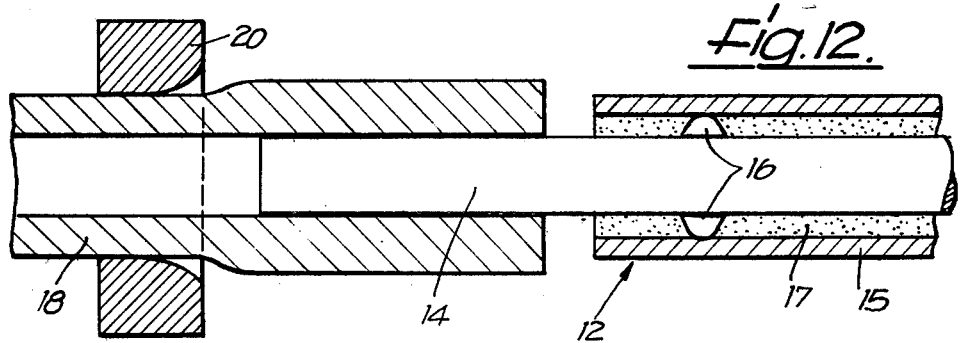

METHOD OF MAKING A HIGH TENSILE CONNECTION FOR OVERHEAD POWER LINES

This is a continuation of application Ser. No. 195,176 filed Oct. 8, 1980 and now abandoned, which was a continuation of application Ser. No. 915,265 filed June 13, 1978 and now abandoned.

BACKGROUND OF THE INVENTION

The present invention relates to devices and a method for providing a high tensile, electrically insulated connection between two sections of the lead wire of an overhead power line. Devices of this type are employed as line separators and phase separators between two sections of a current-carrying lead wire which terminate at a distance from each other. A line separator is necessary when the voltage of one lead wire section has the same phase as the voltage of the other lead wire section, but when both lead wire sections have to be electrically insulated from each other. A phase separator is necessary when the electrical voltage of one lead wire section has a different phase than the electrical voltage of the other lead wire section.

The known line separators and phase separators are subject to the disadvantage of a complicated, expensive construction, are heavy, and cannot be mounted on the lead wire before the same is cut in two for separation. The complicated and expensive construction is not only economically disadvantageous, but also contributes to the large weight of the device. A large weight of a line separator or phase separator leads to the problem that the current collector of the vehicle being fed by the lead wire receives a jolt as it passes over the separator, which exerts a downward force, i.e., in the sense of a lifting away of the current collector from the separator. The greater the speed of the vehicle, the greater is this force. Because a lifting of the current collector caused by this jolt must be avoided, and the maximum speed at which the known line separators and phase separators can be passed over by the current collector without a lifting thereof, lies only slightly above the speeds now common, the known line separators and phase separators are not usable for the expected increased travel speeds of around 150 miles per hour.

SUMMARY AND OBJECTS OF THE INVENTION

A primary objective of the invention is to provide a device and method for a high tensile, electrically insulated connection for two sections of the lead wire of an overhead line, which is simple, has a low weight, and can be mounted on the power lead wire before it is cut for separation into the two sections. This objective is attained by two parallel spaced, rod-like, glass-fiber-reinforced plastic insulators, each end of which is connected with a metal rod of the same outside diameter, and the under side of which lies at least approximately in the plane defined by the under side of the power lead wire, two traverses which extend across the longitudinal direction of the insulator rods and are formed as tubes with which the metal rods attached to the ends of the insulator rods are rigidly connected, and by wires or wire cables connected with the traverses for attaching the traverses to a support, and by lead wire clamps connected with each of the traverses for connecting the two lead wire sections with one or the other of the traverses. Because the device consists of only relatively few individual parts, it has a simple construction. In addition, because the few individual parts are relatively lightweight, which is attained by forming the insulators from glass-fiber reinforced plastic rods and by forming the traverses as tubes, the weight of the device is so small that it can be passed over at speeds above 150 miles per hour without fear of a lifting-off of the current collector. Because of the frame-like form of the device according to the invention, it is also not difficult to mount the device on a lead wire which has not yet been cut, and then to cut through the lead wire for the purpose of separation. This substantially simplifies mounting as compared to a mounting on sections of the lead wire which have already been separated from each other, because in the latter case the ends of the two lead wire sections must be held by means of an additional device which interferes with the mounting of the line separator or phase separator.

Further advantages of the device and method according to the invention will be seen from the following description and the associated drawings of two exemplary embodiments, of which one is a line separator and the other is a phase separator. In the drawings:

BRIEF DESCRIPTION OF THE DRAWINGS

FIG. 1 is a side view of the first exemplary embodiment in the mounted condition;

FIG. 2 is a cross-section view taken along line II—II of FIG. 1;

FIG. 3 is an enlarged view of the section designated Z in FIG. 1;

FIG. 4 is a cross-section view taken along line IV—IV of FIG. 3;

FIG. 5 is a cross-section view taken along line V—V of FIG. 2;

FIG. 6 is an enlarged view of the section designated Y in FIG. 1;

FIG. 7 is a side view of the second exemplary embodiment in the mounted condition;

FIG. 8 is a cross-section view taken along line VIII—VIII of FIG. 7;

FIG. 9 is a cross-section view taken along line IX—IX of FIG. 8;

FIG. 10 is a cross-section view taken along line X—X of FIG. 2;

FIG. 11 is an enlarged cross-section view taken along line XI—XI in FIG. 2; and

FIG. 12 is a longitudinal section according to FIG. 11 through one of the ends of the metal rod connected therewith showing the radial compression of the metal rod, as well as a longitudinal section through the tool employed for the compression.

DETAILED DESCRIPTION OF A PREFERRED EMBODIMENT

A line separator, with which two lead wire sections 10 and 11 of the lead wire of an overhead line for electrically driven rail vehicles are firmly connected with each other although electrically insulated from each other, has two parallel, spaced insulator rods 12 and 13, which are formed identically and which not only electrically insulate the lead wire sections from each other, but also transfer the tensile forces which the lead wire sections exert on the line separators. The insulating rods 12 and 13 each consist of a glass-fiber reinforced plastic rod 14, which, as shown in FIGS. 10 and 11, is surrounded at a distance by a tube 15 of an electrically insulating material, in the exemplary embodiment, of polyfluorethylene. Distance maintaining elements 16, which are arranged at a distance from each other both circumferentially as well as in the longitudinal direction of the glass-fiber reinforced plastic rod 14, assure a concentric position of the tube 15 with regard to the plastic rod 14. The intervening space between the plastic rod 14 and the tube 15 is filled with an electrically insulating material, in the exemplary embodiment, with a permanently elastic resin 17. The tube 15, along which the current collector (not shown) of the rail vehicle traveling past the line separator glides, protects the plastic rod 14 from mechanical damage, and the permanently elastic resin 17 protects against ultra-violet rays because of its uniform thickness quaranteed by the distance maintaining elements 16. The weight of the insulating rods 12 and 13 is very low, but their tensile strength is very high. One end of the two insulating rods 12 and 13 is rigidly connected with a short metal tube 18, and the other end is rigidly connected with a long metal tube 19. Both tubes 18 and 19 of each insulating rod in the exemplary embodiment consist of a copper alloy. They could, however, also be made out of a stainless steel. By forming this element as a tube instead of a massive rod, a lower weight is attained.

The connection of the long metal tube 19 with the insulating rod 12 or 13 is formed in the same manner as the connection shown in FIG. 11 between the short metal tube 18 and the insulating rod 12. The end section of the glass-fiber reinforced plastic rod 14, which projects out of the tube 15, engages the metal tube 18 which is radially compressed in this region. The compression takes place, as FIG. 12 shows, in a manner whereby the outside diameter of the metal tube 18, which is at first larger in the area containing the plastic rod 14 than in the other section, is decreased with the aid of an annular drawing die 20 to the outside diameter of the latter section. The drawing die 20 is thereby drawn from the position shown in FIG. 12 toward the end of the metal tube 18 confronting the tube 15. In so doing, the end section of the metal tube 18 is increasingly compressed in the radial direction. The outside diameter, which is uniform over the entire length of the metal tube after the compression, is exactly adapted to the outside diameter of the tube 15 the end of which abuts the front surface of the metal tube 18 after the compression, as shown in FIG. 11.

A short, massive metal rod 21 is joined to the end of each short metal tube 18 opposite the insulating tube 15, as well as the corresponding end of each long metal tube 19. The outside diameter of this short massive metal rod 21 is the same as that of the metal tubes 18, 19. For connection purposes, the metal rods 21, which, in the exemplary embodiment, are made of copper, each have a projecting threaded pin 21' on one end. Threaded pin 21 engages in a central threaded bore of the adjoining metal tube 18 or 19. The other end of each of the four massive metal rods 21 is connected to a thin-walled tube 22 of stainless steel by means of a pin 21' provided on the metal rod 21, which engages in the tube 22 and is rigidly connected therewith, for example, by compression. Apart from the free end section of the thin-walled tube 22, which is bent slightly upwardly, the longitudinal axis of the tube 22 meets with the longitudinal axis of the rod 21 at an angle of about 2° or 3°, so that the railway vehicle current collector approaching the line separator from the lead wire section 10 or 11, comes into contact with the thin-walled tubes 22 at the smallest possible angle. All of the tubes 22 have an equal length, and their outside diameter is the same as that of the adjoining massive metal rod 21.

As shown in FIGS. 1 and 2, the two insulator rods 12 and 13 are rigidly connected together with a traverse or cross piece 23 in the region of their associated two massive metal rods 21. The two identical traverses 23 are each formed by a rectangular tube of steel, which is arranged slightly above the two insulator rods 12, 13 and have longitudinal axes crossing at right angles to the axes of the two insulator rods 12 and 13. Two spaced, plate-like clamping jaws 24 are welded to each end of the two parallel traverses 23 on the undersides thereof, as shown in FIG. 4. The clamping jaw pairs 24 each form a downwardly opening clamping channel 25 for the associated massive metal rod 21, the latter of which are provided on both sides with undercut contact surfaces for the clamping jaws 24. These contact surfaces are somewhat larger in the axial direction of the rods 21 than the length of the clamping jaws 24. The distance of these side contact surfaces from each other is adapted to the width of the clamping channel 25. Bolts 26 penetrate both the clamping jaws 24 and the massive metal rod 21, the latter of which project downwardly below the clamping jaws and associated nuts clamp the rod 21 securely in the clamping channel 25.

As shown in FIG. 2, the positions of the short and long metal tubes 18 and 19 alternate with the two insulating rods 12 and 13. The short metal tube 18 of one of the insulating rods thus confronts the same traverse 23 as the long metal tube 19 of the other insulating rod. The distance of the ends of the two long metal tubes 19 directed generally toward each other, as measured in the longitudinal direction of one of the two insulating rods 12 or 13, is somewhat smaller than the distance between the two wear plates of the current collector, which plates are usually arranged in current collectors to contact the lead wire one behind the other in the direction of travel.

A clamp 27 is placed on the end of each metal tube 19 connected with the glass-fiber reinforced plastic rod 14, by means of which an arc horn or arc suppressor 28 is rigidly mechanically and electrically conductively connected with the tube 19. The two identically formed arc horns 28, as shown in the FIGS. 1 and 2, extend from the point of attachment through a sharp angle to the center between the two insulator rods 12 and 13, and then in an arc upwardly and away from each other. The rod, from which the arc horns 28 are made, is of substantially smaller diameter than the insulating rods 12 and 13 for reasons of weight.

At the mid-point, that is, in the center between the two clamping jaw pairs 24, the two traverses 23 are each surrounded by a central frame, the arms of which abutting the two side surfaces of the traverses, are formed by two identical plates 29, which project downwardly beyond the underside and upwardly beyond the upper side of the traverses. The two upwardly projecting sections of the plates 29 are held together by two bolts 30 and nuts 31 which are spaced from each other in the longitudinal direction of the traverses and the downwardly projecting sections of the plates 29 are held together by a bolt 32 and a nut 33. As shown particularly in FIG. 5, a lead wire clamp 34 is clamped to the bolt 32 which lies parallel to the two insulator rods 12 and 13 in the area between the two plates 29. The lead wire clamp 34 consists of two clamping jaws, which form two clamping channels and clamping bolts 35, which hold the clamping jaws together between the two clamping channels. One of the clamping channels encloses the bolt 32 and the other encloses the top of the lead wire 10 or 11 and securely holds it with sufficient force to avoid displacement of the lead wire section in the lead wire clamp 34. The distance of the bolt 32 from the bolts 30 is chosen so as to be large enough that the central frame can be pushed far enough upwardly or downwardly relative to the traverses after the bolts have been loosened so that the lower side of the lead wire can be placed in the plane defined by the lower side of the insulating rods 12 and 13 and the metal tubes 18 and 19 despite different degrees of wear on the lead wire. The frame thus represents a simple and lightweight device for connecting the lead wire with the traverses and for height adjustments of the lead wire relative to the insulating rods.

The free end portion of the lead wire section 10 or 11 which projects beyond the lead wire clamp 34 is bent upwardly, as shown in FIG. 1, in a shape which generally corresponds to the shape of the free end of the thin-walled tube 22.

To the extent that a current feed into the lead wire sections 10 and 11 is necessary in the area of the line separator, a feed clamp 36 is clamped to one of the bolts 30, which feed clamp 36 has, similar to the lead wire clamps 34, two parallel clamping channels, one of which contains and locks in position the bolt 30 and the other of which similarly contains and locks in position the feed conductor 37.

The line separator is suspended, as shown in FIG. 1, from a substantially horizontal support cable 38, in which two insulators 39 are placed, one in the area of each line separator. Outside the section of the support cable 38 lying between the two insulators 39 and above each of the two traverses 23, a pair of cables 40 is clamped to the support cable 38. The other ends of the two cables of each cable pair 40 are connected to the respective ends of the associated traverse, which, for this purpose, are provided on the upper side adjacent each end with an eye 41. In order to be able to precisely adjust the position of the two traverses 23 and thereby of the entire line separator, a length adjusting device 42 is provided in each cable of the two cable pairs 40. As shown in FIG. 6, the length adjusting device 42 has a tubular element 43, which is provided on the interior with a left-hand thread over half its length and with a right-hand thread over the other half. Two threaded bolts 44, one with a left-hand thread and one with a right-hand thread are threaded into these two threaded sections, and each carries a lock nut 45, which prevents an accidental rotation of the threaded bolts relative to the tubular element. The ends of the threaded bolts 44 directed away from the tubular element 43 are provided with a central longitudinal bore. The two cable ends which are to be connected by the length adjustment device 42 are placed in these longitudinal bores, and then are rigidly connected with the threaded bolts by compression in the area of the longitudinal bore.

The mounting takes place in a manner whereby the entire line separator is suspended from the support cable 38 and is connected with the lead wire (which is as yet uninterrupted) by means of the lead wire clamps 34. The positions of the two traverses 23 are then corrected as necessary with the longitudinal adjusting devices 42 and the position of the underside of the lead wire with regard to the plane of the undersides of the insulating rods 12 and 13 is corrected with the aid of the central frame supporting the lead wire clamp 34. The lead wire is then cut twice at equal distances from the two traverses and the end portions projecting beyond the traverses are then bent upwardly.

The phase separator shown in the FIGS. 7 through 9 is generally formed in the same manner as the previously described line separator. To avoid repetition, the phase separator is described below only to the extent that it varies from the line separator shown in FIGS. 1-6.

The two glass-fiber reinforced plastic rods 112, 113 are rigidly connected on both ends with short metal tubes 118, which have the same outside diameter as the tubes 115 concentrically surrounding the plastic rods. The two tubes 115, therefore, terminate at a relatively small distance from the two traverses 123. A further difference as compared to the line separator is that the arc horns clamped to the long metal tubes are replaced by arc horns 157, 158.

Finally, exemplary embodiment of the phase separator is distinguished from the exemplary embodiment of the line separator by the fact that a metal clamp 150 is placed at the center on top of each of the two tubes 115 which surround the glass-fiber reinforced plastic rods and these clamps 150 project downwardly beyond the tube 115. An electrically conductive, flexible cable 151 is mechanically and electrically connected with each clamp 150 and leads upwardly. As FIG. 9 shows, the two cables 151 are bent toward each other to form arcs and are then introduced into and compressed with electrically conductive tubes 152. The ends of the aligned tubes 152 which are directed toward each other are rigidly and electrically conductively connected with each other by means of a cross-connecting element 153 to form a bridge structure. Of course, a one-piece tube could also be utilized instead of the two tubes 152. On the ends of the two tubes 152, each connected with a flexible cable 151, clamps 157 are located to which one end of a respective cable 155 is connected. The two cables 155 hold the tubes 152 in a plane which lies parallel to the plane defined by the insulating rods 112 and 113. If these two insulating rods are slightly raised by a current collector, only the two flexible cables 151 experience a certain deformation. This is important because the weight of the tubes 152, the connecting element 153 and the two arc horns 157 and 158 connected therewith advantageously do not act as counterforces during a raising of the insulator rods 112 and 113 by a current collector. A small, but negligible, counterforce is produced only by the two flexible cables 151 as a result of their deformation.

The two identically formed arc horns 157 and 158 are tubes, one end of each being rigidly and electrically conductively connected with the connecting element 153. The two arc horns extend away from the connecting element at right angles to the tubes 152 and thereby parallel to the insulator rods 112 and 113 toward one or the other of the upwardly bent free ends of the two lead wire sections 110 and 111. The mid-section of each arc horn 157, 158 lies only slightly higher than the two insulator rods 112 and 113. As shown in FIG. 7, the free end sections of the arc horns which are directed toward the free ends of the lead wire sections are similarly bent upwardly. The end sections which are connected with the connecting element 153 are also guided upwardly in order to be able to guide the flexible cable 151 to the tubes 152 in a relatively large arc, so that the force necessary to deform these cables can be kept as low as possible.

The two arc horns 157 and 158 are suspended on the support cable 138 in the region of the mid-sections thereof by means of cables 159. The height position of the arc horns can be corrected to the necessary degree by a longitudinal shifting of the clamps 160 on the cable 138.

A ground cable 161, which is also connected with the support cable 138 in the area between the two insulators 139, is electrically conductively connected to the arc horn 158 and may, if desired, be connected to the bridge structure 152, 153. In this manner the two tubes 152, the flexible cables 151 and clamps 150 are also at ground potential. It is a specific purpose of the two clamps 150 to prevent stray currents from one end of the insulating rods 112 and 113 to the other. The two arc horns 157 and 158, in contrast, have the purpose of suppressing arcing from the current collector between the end portions of the lead wire sections 110 and 111 and the current collector.

Although only preferred embodiments are specifically illustrated and described herein, it will be appreciated that many modifications and variations of the present invention are possible in light of the above teachings and within the purview of the appended claims without departing from the spirit and intended scope of the invention.

What is claimed is:

1. A process for forming a high tensile connection between a glass-fiber reinforced plastic rod extending axially from an end portion of an insulating cover and a metal rod having an end portion and a clamping channel in said end portion which extends along the longitudinal axis of said metal rod, comprising the steps of inserting the plastic rod into the clamping channel to a point where there remains an axial spacing between the end portion of the metal rod and the end portion of the insulating cover, and progressively in an axial direction deforming the metal rod from a location removed from its said end portion to said end portion having the clamping channel to radially decrease the diameter of the metal rod on the plastic rod and fill in the said axial spacing to the point where the end portion of the metal rod abuts the end portion of the insulating cover.

2. The invention of claim 1, wherein the outer diameter of the metal rod at its said end portion prior to deformation is greater than the outer diameter of the insulating cover at its said end portion and comprising carrying out said deformation to radially decrease said rod outer diameter to equal the outer diameter of the insulating cover adjacent the abutment of the rod and insulating cover end portions.

3. The invention of claim 1 or claim 2, wherein the progressive deforming is carried out by means of a drawing die and comprising axially moving the metal rod and drawing die relative to each other to achieve the progressive deformation.

* * * * *